(12) United States Patent  
Tang et al.

(10) Patent No.: US 10,803,544 B2  
(45) Date of Patent: *Oct. 13, 2020

(54) SYSTEMS AND METHODS FOR ENHANCING MACHINE VISION OBJECT RECOGNITION THROUGH ACCUMULATED CLASSIFICATIONS

(71) Applicant: Capital One Services, LLC, McLean, VA (US)

(72) Inventors: Qiaochu Tang, The Colony, TX (US); Geoffrey Dagley, McKinney, TX (US); Micah Price, Plano, TX (US); Sunil Vasisht, Flowermound, TX (US); Stephen Wylie, Carrollton, TX (US); Jason Hoover, Grapevine, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,279

(22) Filed: May 29, 2019

(65) Prior Publication Data

US 2019/0279329 A1   Sep. 12, 2019

Related U.S. Application Data

(63) Continuation of application No. 15/910,578, filed on Mar. 2, 2018, now Pat. No. 10,339,622.

(51) Int. Cl.
*G06K 9/62* (2006.01)
*G06T 1/00* (2006.01)
(Continued)

(52) U.S. Cl.
CPC ........ *G06T 1/0014* (2013.01); *G06K 9/00208* (2013.01); *G06K 9/00671* (2013.01);
(Continued)

(58) Field of Classification Search
CPC combination set(s) only.
See application file for complete search history.

(56) References Cited

U.S. PATENT DOCUMENTS 5,912,986 A   6/1999   Shustorovich
6,735,337 B2  5/2004   Lee et al.
(Continued)

*Primary Examiner* — Tsung Yin Tsai
(74) *Attorney, Agent, or Firm* — Troutman Pepper Hamilton Sanders LLP; Christopher J. Forstner; John A. Morrissett

(57) ABSTRACT

The disclosed technology includes systems and methods for enhancing machine vision object recognition based on a plurality of captured images and an accumulation of corresponding classification analysis scores. A method is provided for capturing, with a camera of a mobile computing device, a plurality of images, each image of the plurality of images comprising a first object. The method includes processing, with a classification module comprising a trained neural network processing engine, at least a portion of the plurality of images. The method includes generating, with the classification module and based on the processing, one or more object classification scores associated with the first object. The method includes accumulating, with an accumulating module, the one or more object classification scores. And responsive to a timeout or an accumulated score exceeding a predetermined threshold, the method includes outputting classification information of the first object.

20 Claims, 7 Drawing Sheets

(51) Int. Cl.
  *G06T 7/00* (2017.01)
  *G06K 9/00* (2006.01)
  *G06K 9/36* (2006.01)
  *H04N 13/00* (2018.01)

(52) U.S. Cl.
  CPC ......... *G06K 9/00718* (2013.01); *G06K 9/627* (2013.01); *G06T 7/001* (2013.01); *G06K 9/36* (2013.01); *G06K 2209/23* (2013.01); *G06T 2207/10021* (2013.01); *G06T 2207/30164* (2013.01); *G06T 2207/30252* (2013.01); *H04N 2013/0096* (2013.01)

(56) References Cited

U.S. PATENT DOCUMENTS

| | | | |
|---|---|---|---|
| 6,847,731 B1* | 1/2005 | Caulfield | G06K 9/741 |
| | | | 382/159 |
| 7,536,032 B2 | 5/2009 | Bell | |
| 7,831,542 B2 | 11/2010 | Milov | |
| 8,478,052 B1* | 7/2013 | Yee | G06K 9/4676 |
| | | | 382/224 |
| 8,649,604 B2 | 2/2014 | Steinberg et al. | |
| 8,768,313 B2 | 7/2014 | Rodriguez | |
| 8,978,370 B2 | 3/2015 | Gonze et al. | |
| 9,269,153 B2 | 2/2016 | Gandolph et al. | |
| 9,576,214 B1* | 2/2017 | Zhang | G06K 9/6267 |
| 9,720,934 B1* | 8/2017 | Dube | G06K 9/46 |
| 10,223,611 B1* | 3/2019 | Price | G06K 9/6232 |
| 10,339,622 B1* | 7/2019 | Tang | G06K 9/627 |
| 2007/0065015 A1 | 3/2007 | Nishiyama et al. | |
| 2009/0245684 A1* | 10/2009 | Makii | H04N 5/272 |
| | | | 382/276 |
| 2012/0007983 A1* | 1/2012 | Welch | G08G 1/017 |
| | | | 348/148 |
| 2012/0106800 A1* | 5/2012 | Khan | G06K 9/6269 |
| | | | 382/104 |
| 2012/0275692 A1 | 11/2012 | Sagawa et al. | |
| 2013/0001295 A1 | 1/2013 | Goncalves | |
| 2013/0195376 A1* | 8/2013 | Baheti | G06T 11/60 |
| | | | 382/289 |
| 2014/0289323 A1 | 9/2014 | Kutaragi et al. | |
| 2015/0016712 A1* | 1/2015 | Rhoads | G06T 17/00 |
| | | | 382/154 |
| 2015/0049910 A1* | 2/2015 | Ptucha | G06K 9/621 |
| | | | 382/103 |
| 2015/0131897 A1* | 5/2015 | Tsao | G06K 9/00718 |
| | | | 382/154 |
| 2015/0379355 A1* | 12/2015 | Kanga | G06K 9/00711 |
| | | | 382/103 |
| 2016/0039436 A1* | 2/2016 | Bhagwatkar | B61L 23/00 |
| | | | 348/148 |
| 2016/0321666 A1* | 11/2016 | Dragushan | G06K 9/6212 |
| 2019/0278994 A1* | 9/2019 | Bumpas | G06K 9/00671 |

* cited by examiner

SYSTEMS AND METHODS FOR ENHANCING MACHINE VISION OBJECT RECOGNITION THROUGH ACCUMULATED CLASSIFICATIONS

CROSS-REFERENCE TO RELATED APPLICATIONS

This application is a continuation of U.S. patent application Ser. No. 15/910,578, filed Mar. 2, 2018, the entire contents of which is incorporated herein by reference.

FIELD

The disclosed technology relates to machine vision, and more specifically to the use of multiple frames and accumulated classifications to enhance object recognition accuracy.

BACKGROUND

Machine vision is a term that can be used to describe hardware and software technology utilized in recognition of certain patterns and/or objects. Many machine vision systems have been designed and built to address needs for recognition without the need for human interaction. For example, character recognition systems and software can extract and convert printed text to a digital format. Other machine vision systems have been developed to automatically inspect industrial products for defects. Yet other machine vision systems have been developed to recognize human faces.

Various approaches have been applied to improve the classification accuracy for object recognition using machine vision. For example, certain recognition systems perform an analysis of patterns and features of an image for classification. Certain systems may process an image to remove noise and/or to delineate pattern features to enable characteristic measurements. Such systems can utilize a training phase and a recognition phase. During the training phase, information representative of distinctions among pattern types is gathered from a set of training samples of patterns whose proper classification is known (i.e. training set) and stored in a computer's memory in the form of numerical parameters and data structures. During this phase, the selected pattern recognition system is tuned to the training set. Once the training set has been completed, an input image can be processed using the trained numerical parameters and data structures to produce a classification representative of a probability that the input image matches one or more of the training sample.

Certain previous recognition methods work well and can achieve high classification accuracy provided the object is well-lit, and the image is not obscured or corrupted to any significant degree. However, object recognition applications that use a camera on a user's mobile computing device can be particularly challenging due to various factors such as poor lighting, poor contrast, blurring, etc. Applications such as these can suffer from a significant degradation in classification accuracy.

Accordingly, there is a need for improved classification accuracy in object recognition systems.

BRIEF SUMMARY

The disclosed technology includes systems and methods for enhancing machine vision object recognition based on a plurality of captured images and an accumulation of corresponding classification analysis scores. In certain example implementations, the disclosed technology includes a system configured to capture a plurality of images of a first object. The system can include a trained neural network processing engine configured to process at least a portion of the plurality of images, and to generate a corresponding plurality of object classification scores associated with the first object. The system is configured to accumulate the plurality of object classification scores, and responsive to an accumulated score exceeding a predetermined threshold, the system is configured to output enhanced classification information of the first object.

In accordance with certain example implementations of the disclosed technology, the plurality of captured images includes one or more of different views, different lighting, different perspectives, different contrast, and different brightness of the first object.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
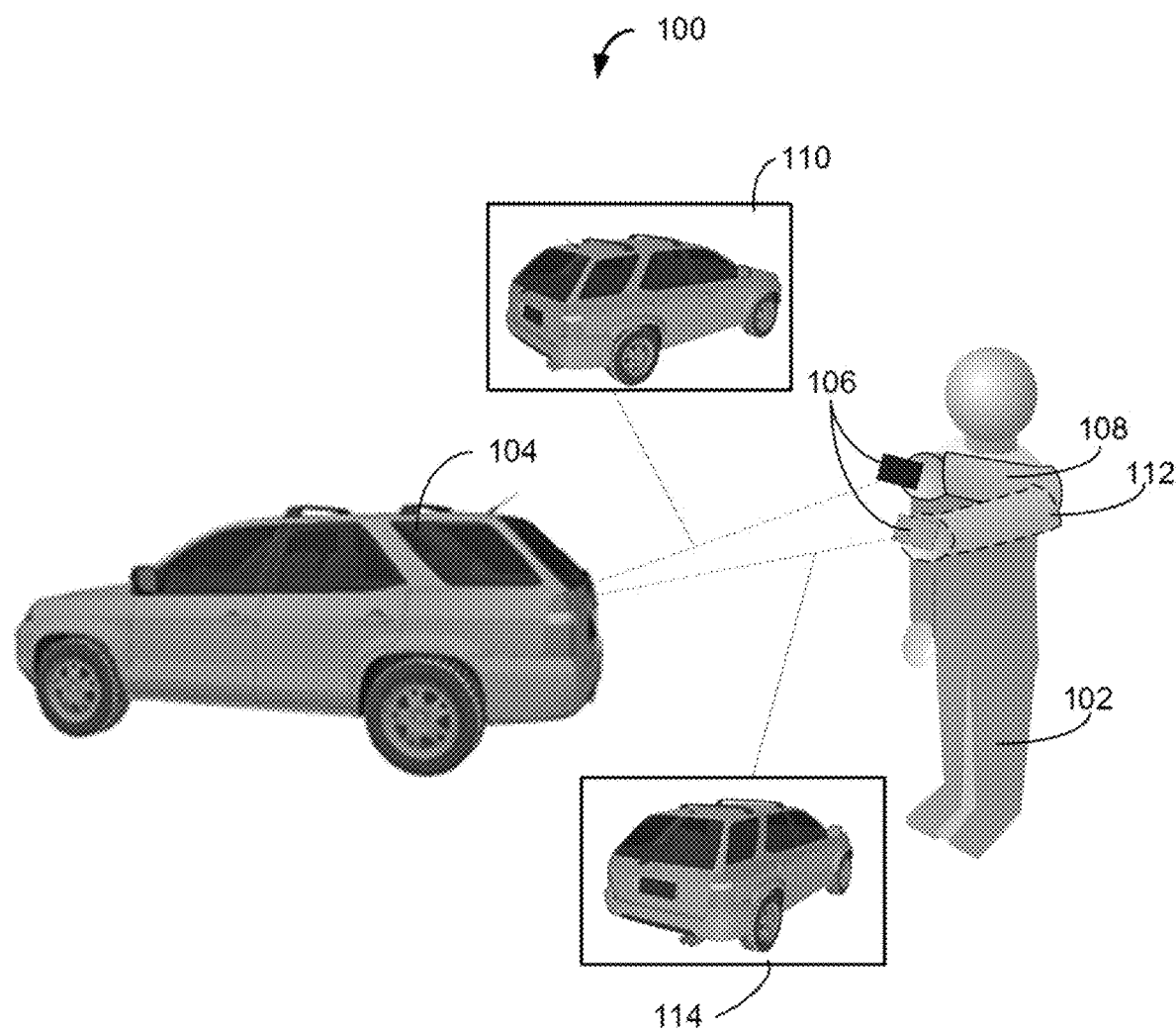
FIG. 1 depicts an example scenario 100 in which a user 102 uses a mobile computing device 106 to capture a series of image frames of an object 104, while movement of the user 102 contributes to different views of the object 104 to be present in the series of image frames, according to an example implementation of the disclosed technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

A machine vision system is disclosed herein. According to an example implementation of the disclosed technology, the machine vision system includes a camera configured to capture a plurality of image frames, each image frame of the plurality of image frames comprising a representation of a first object; a classification module in communication with a memory, the classification module is configured to process the plurality of image frames to generate a corresponding plurality of object classification scores associated with the first object; an accumulation module in communication with the classification module, the accumulation module configured to accumulate the plurality of classification scores; a discernment module in communication with the accumulation module, the discernment module configured to output classification information of the first object responsive to a timeout or an accumulated score exceeding a predetermined threshold; and a display configured to output an indication of the classification information. In certain example implementations, the classification module may include a trained neural network processing engine.

According to another example implementation of the disclosed technology, a computer-implemented method is disclosed. The method includes capturing, with a camera of a mobile computing device, a plurality of images, each image of the plurality of images comprising a first object. The method includes processing, with a classification module comprising a trained neural network processing engine, at least a portion of the plurality of images. The method includes generating, with the classification module and based on the processing, one or more object classification scores associated with the first object. The method includes accumulating, with an accumulating module, the one or more object classification scores. And responsive to a timeout or an accumulated score exceeding a predetermined threshold, the method includes outputting classification information of the first object.

According to another example implementation of the disclosed technology, a non-transitory computer-readable storage medium storing instructions for use with a machine vision system is disclosed. According to an example implementation of the disclosed technology, the instructions are configured to cause the system to perform a method comprising capturing, with a camera of a mobile computing device, a plurality of images, each image of the plurality of images comprising a first object. The method includes processing, with a classification module comprising a trained neural network processing engine, at least a portion of the plurality of images. The method includes generating, with the classification module and based on the processing, one or more object classification scores associated with the first object. The method includes accumulating, with an accumulating module, the one or more object classification scores. And responsive to a timeout or an accumulated score exceeding a predetermined threshold, the method includes outputting classification information of the first object.

FIG. 1 depicts an example scenario 100 in which a user 102 directs a camera of a mobile computing device 106 towards an object 104 (such as a vehicle) to capture a series of image frames 110, 114 of the object 104. In certain example implementations, the camera may be configured to capture video. In certain example implementations, the camera may be configured to capture a series of images, such as a burst of image frames. Accordingly, any intentional and/or unintentional movement of the user 102 and/or changing environmental conditions (lighting, etc.) may render each image frame in the series to have slightly different views of the object 104 such that each of the image frames has unique lighting, perspective, contrast, brightness, size, etc.

In certain example implementations, the user 102 may initiate the capturing the series of frames via opening an application on the mobile computing device 106. In certain example implementations, the user 102 may direct the camera of the mobile device 106 at the object 104 while the user's arm is in a first position 108. A corresponding initial image frame 110 of the object 104 may be captured and may include a first perspective of the object 104. Subsequently, the user 102 may move their arm to a second position 112 (while images continued to be obtained) to capture a subsequent image frame 114 having a view (perspective, lighting, etc.) that differs from the view of the initial image frame 110. While the differences in the views of the object 104 may be subtle, or even imperceptible to a user, such differences may be used to enhance the recognition of the object 104.

In accordance with certain example implementations of the disclosed technology, the user may capture image frames 110, 114 of the object 104 while moving around the object 104 such that certain features of the object 104 may be more pronounced in some frames, while less pronounced in other frames. According to certain example implementations of the disclosed technology, a classification engine running on the mobile computing device 106 may be trained to distinguish among different objects 104 based on certain features. For example, in the case where object 104 is a vehicle, the front right-side blinker lens of the vehicle may be viewable in the initial image frame 110, but not in a subsequent image frame 114. Thus, certain views of the object 104 may include unique feature information that can be extracted and utilized by the classification engine to provide a score representative of a confidence or probability that the particular view of the object 104 matches with a corresponding representation of an object in the trained machine vision model.

Certain example implementations of the disclosed technology take advantage of (perceptible or imperceptible) variations among the frames to enhance the accuracy of the object recognition. Experiments indicate that object recognition accuracy may be enhanced using the disclosed technology, even when the user is attempting to remain still during the image capture process.

Figure 2A:
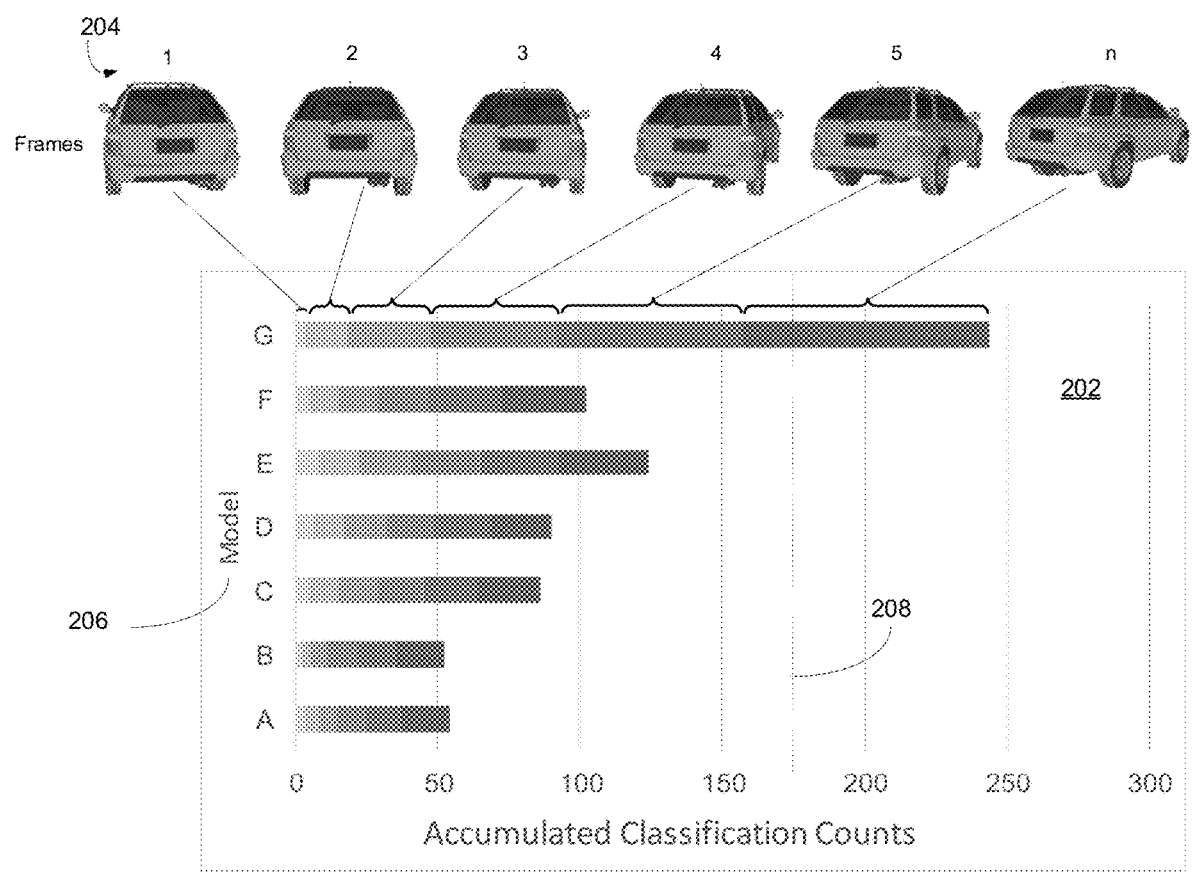
FIG. 2A depicts an example graph 202 of accumulated classification counts for image frames 204 having different object perspectives, according to an example implementation of the disclosed technology.

FIG. 2A depicts an example graph 202 of accumulated classification counts for image frames 204 (1, 2, . . . n) classified by a machine vision system trained to recognize vehicles 206 (denoted A through G) according to an example implementation of the disclosed technology. In this example illustration, each of the image frames 204 may represent a slightly different perspective view of the object (vehicle). In certain example implementations, the different perspective views may be the result of a user moving around the object while capturing the series of image frames 204. Yet in other example implementations, the slight natural movements of a "stationary" user while capturing the series of image frames may be sufficient to provide small variations in the perspective views of the object, and which may be utilized by the disclosed technology to distinguish among objects.

Table 1 depicts determined classification scores for each individual image frame (corresponding to frames 204 of FIG. 2A), with a higher score indicating a better match for a particular make/year/model of vehicle 206. In this example, 7 different makes/years/models of vehicles (A . . . G) 206 on which this system is trained are evaluated for a match with each of the (1 . . . n) image frames 204.

TABLE 1

Classification scores for each vehicle make/year/model and frame.

| Frame | Vehicle | | | | | | |
|---|---|---|---|---|---|---|---|
| | A | B | C | D | E | F | G |
| 1 | 3 | 2 | 5 | 6 | 8 | 5 | 3 |
| 2 | 2 | 1 | 5 | 5 | 6 | 5 | 12 |
| 3 | 1 | 3 | 4 | 4 | 5 | 4 | 14 |
| 4 | 4 | 5 | 2 | 2 | 5 | 4 | 16 |
| 5 | 3 | 2 | 3 | 3 | 4 | 7 | 20 |
| n | 4 | 4 | 3 | 1 | 3 | 5 | 22 |

As depicted in Table 1, and for this illustrative example, if the first image frame were the only image frame available, the system may incorrectly identify vehicle "E" as the most likely (or best match) vehicle since it has the highest classification score for that image frame. According to an example implementation of the disclosed technology, as the different views are processed, distinguishing features may be utilized to provide a more accurate classification score. For example, distinguishing features for a vehicle can include shapes and/or relative placement of one or more of: windows, bumpers, trim, lights, blinkers, lenses, panels, logos, rims, antenna, windshield features, doors, grill, accessory racks, etc.

Table 2 depicts accumulated classification scores for each successive image frame 204, with a higher score indicating a better match for a particular vehicle 206. The accumulated scores in Table 2 correspond to a frame-by-frame (and row-by-row) summation of the scores shown in Table 1 and are graphically represented by the length of bars in FIG. 2A.

TABLE 2

Accumulated classification scores for each vehicle make/year/model and frame.

| Frame | Vehicle | | | | | | |
|---|---|---|---|---|---|---|---|
| | A | B | C | D | E | F | G |
| 1 | 3 | 2 | 5 | 6 | 8 | 5 | 3 |
| 2 | 5 | 3 | 10 | 11 | 14 | 10 | 15 |
| 3 | 6 | 6 | 14 | 15 | 19 | 14 | 29 |
| 4 | 10 | 11 | 16 | 17 | 24 | 18 | 45 |
| 5 | 13 | 13 | 19 | 20 | 28 | 25 | 65 |
| n | 17 | 17 | 22 | 21 | 31 | 30 | 87 |

FIG. 2A also depicts a threshold 208 which may be utilized, for example, to terminate the recognition process when one of the accumulated classification counts exceeds the threshold. In certain example implementations of the disclosed technology, the threshold 208 may be dynamically adjusted based on one or more of: a percentage of accumulated classification counts; one or more differences between accumulated classification counts for the various vehicles 206; and a minimum value. In accordance with certain example implementations of the disclosed technology, if a minimum classification value is not achieved for any of the accumulated values within a specified time, the system may terminate the recognition process, and the vehicle 206 having the highest accumulated classification counts (as output by the machine vision model) may be identified, and/or an indication may be output indicating insufficient recognition of the object. In certain example implementations of the disclosed technology, if a minimum classification value is not achieved, a set of the most likely matching objects may be output with an indication that insufficient certainty was achieved.

Figure 2B:
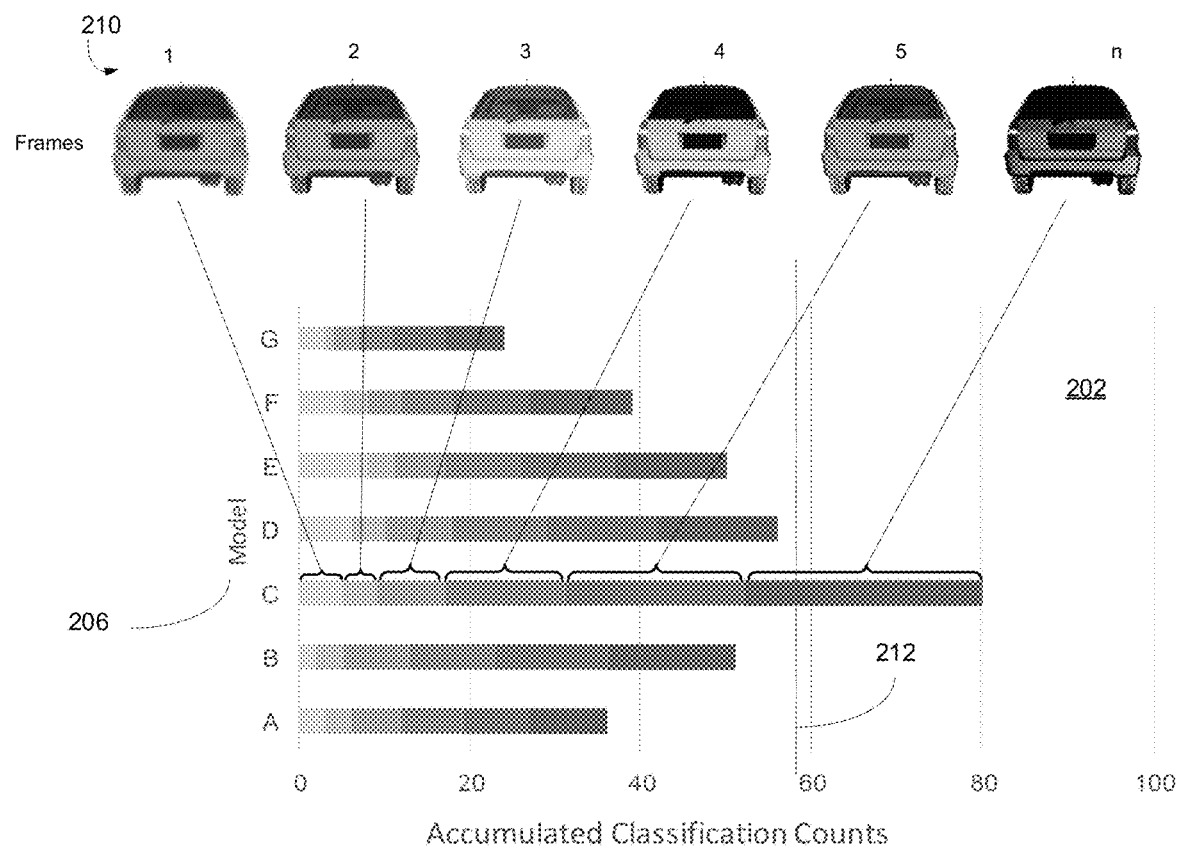
FIG. 2B depicts an example graph 202 of accumulated classification counts for image frames 204 having the same object perspective, but having different image characteristics, according to an example implementation of the disclosed technology.

FIG. 2B depicts another example implementation of the disclosed technology in which an accumulation of classification counts may be utilized to enhance object recognition based on image characteristics and variations (besides or in addition to different perspectives). For example, one or more image characteristics including but not limited to: brightness, contrast, focus, sharpness, color, tint, noise, etc., may contribute to variations among the image frames, and such variable image characteristics may be utilized by the disclosed technology to enhance object recognition.

While FIG. 2A depicts an illustrative process in which the series of image frames 204 are classified by vehicle 206 and based primarily on different perspective views of an object, FIG. 2B depicts an example process of classifying image frames 210 that have the same approximate perspective, but that varies by image characteristics. For example, FIG. 2B depicts an example graph 202 of accumulated classification counts for image frames 210 (1, 2, . . . n) classified by vehicles 206 (denoted A through G) according to an example implementation of the disclosed technology. In this example illustration, one or more of the image frames 210 may have slightly different image characteristics. According to an example implementation of the disclosed technology, such variations among the image frames 210 may be utilized by the disclosed technology to enhance object recognition through an accumulation of counts, as discussed above.

In certain example implementations, the different image characteristics may be the result of various environmental and/or camera variations that can occur while capturing the series of image frames 210. For example, frame 1 of the series of frames 210, as shown in FIG. 2B is an out-of-focus image; frame 2 is a normal exposure; frame 3 is characterized by increased brightness; frame 4 is characterized by increased contrast; frame 5 is characterized by decreased contrast, and frame n is characterized by reduced brightness and increased contrast.

According to an example implementation of the disclosed technology, the different image characteristics (brightness, contrast, focus, sharpness, color, tint, noise, etc.) may be affected by controlling the corresponding functions of the camera (for example, the camera of the mobile computing device 106 as depicted in FIG. 1) during the image capture process. For example, in one implementation of the disclosed technology, a variable exposure schedule may be utilized to capture the different frames 210. In another example implementation, a variable focus schedule may be utilized to capture the different frames 210.

In certain example implementations, the camera may capture the different image frames 210 using auto-focus and/or auto-exposure, which may also produce a series of image frames having different image characteristics. In certain example implementations, the different image characteristics present in a series of image frames 204 may be related to changes in natural lighting, for example, due to varying cloud coverage.

FIG. 2B also depicts another threshold 212 which may be utilized, for example, to terminate the recognition process when one of the accumulated classification counts exceeds the threshold. As discussed above with reference to FIG. 2A, the threshold 212 may be dynamically adjusted based on one or more of: a percentage of accumulated classification counts; one or more differences between accumulated classification counts for the various vehicles 206; and a minimum value. In accordance with certain example implementations of the disclosed technology, if a minimum value is not achieved for any of the accumulated values, the system may use a timeout to terminate the recognition process, and the vehicle 206 having the highest accumulated classification counts may be identified, or an indication may be output indicating insufficient recognition of the object.

It should be understood that any combination of user movements, environmental lighting, and camera functions (such as exposure, focus, etc.), may lead to different image characteristics and/or perspectives, and may be utilized by the disclosed technology to enhance the object recognition.

Certain example implementations of the disclosed technology may utilize location information (such as GPS coordinates, geofencing, etc.) to provide enhancements to the process of object recognition. For example, a GPS receiver on the user's mobile computing device may be utilized to determine an approximate location for which the different image frames 204, 210 are captured. In one example scenario, the user (such as user 102 as shown in FIG. 1) may be operating the image recognition application at a location that corresponds to a car dealership lot. In certain example implementations, the user's mobile computing device may access and utilize data from an inventory management system and may use the location information to filter and/or exclude object classification scores based on location, for example, to exclude objects that are not expected to be present at or near that location. In another example scenario, the image recognition application may utilize the location information to utilize a machine vision model that corresponds with a subset of objects (certain vehicle brands, for example) that are likely to be nearby based on the location data. In certain example implementations of the disclosed technology, signage, QR codes, barcodes, emblems, and/or other identifying features near or attached to the object may be utilized to enhance object recognition.

Figure 3:
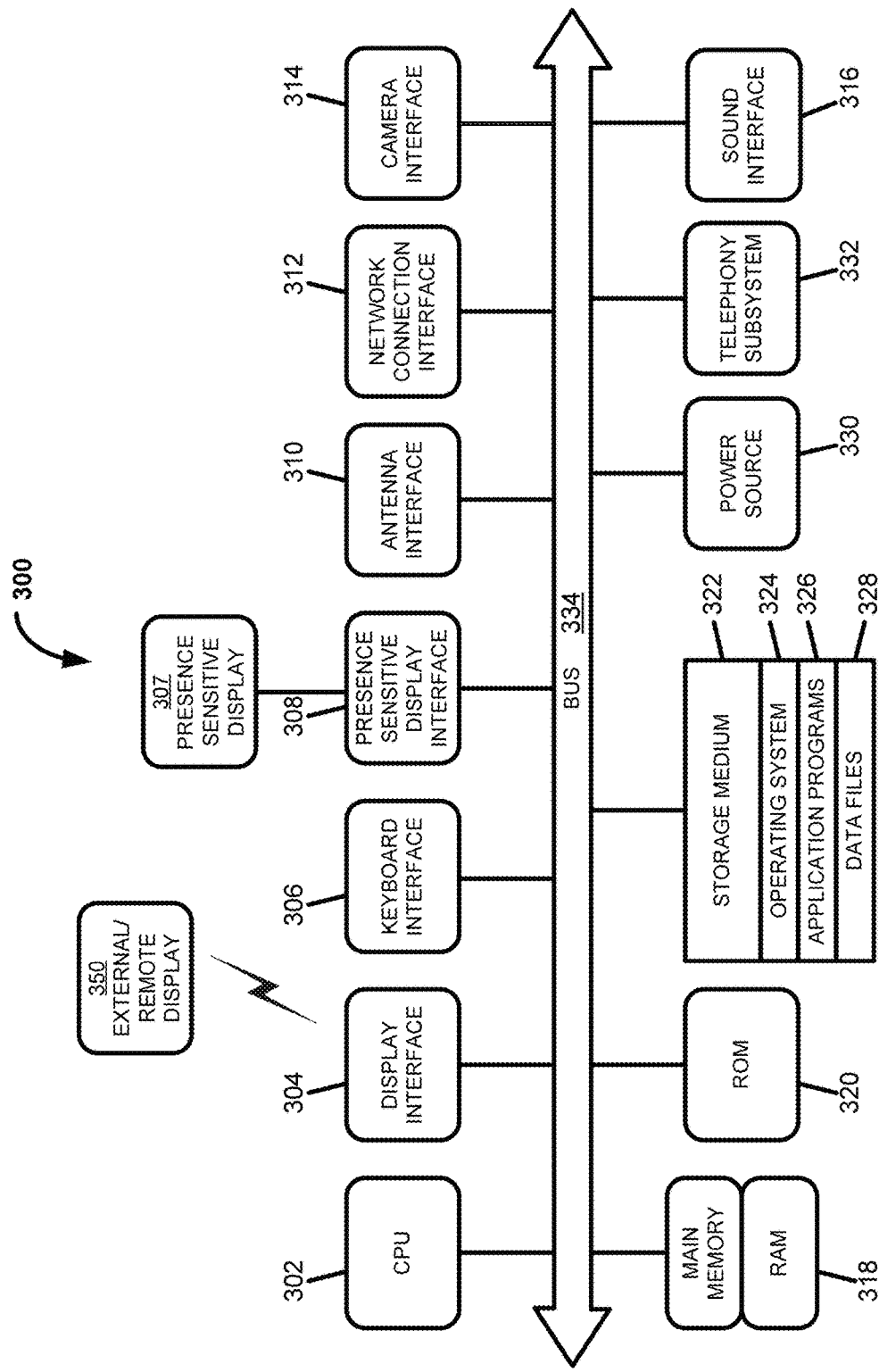
FIG. 3 is a block diagram of an illustrative computing device 300 according to an example implementation of the disclosed technology.

FIG. 3 depicts a block diagram of an illustrative computing device 300 according to an example implementation. Certain aspects of FIG. 3 may be embodied in the mobile computing device 106 as shown in FIG. 1. According to one example implementation, the term "computing device," as used herein, may be a CPU or conceptualized as a CPU (for example, the CPU 302 of FIG. 3). In this example implementation, the computing device (CPU) may be coupled, connected, and/or in communication with a network via communication channels including, but not limited to Internet connections, satellite communications, wireless channels, cloud connections, etc.

In an example implementation, the computing device may output content to its local display and may transmit and receive messages via the antenna interface 310, the network connection interface 312, telephony subsystem 332, etc. In an example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing module (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Certain example implementations of the computing device 300 may include an antenna interface 310 in communication with an antenna. Certain example implementations of the antenna interface 310 can include one or more of: a receiver, analog-to-digital converter, sampler, buffers, and memory. Certain example implementations can include a network connection interface 312 that provides a communication interface to a network.

In certain implementations, a camera interface 314 may act as a communication interface to provide functions for capturing digital images (and/or video) from a camera. In certain example implementations, the camera interface 314 may be utilized to control certain characteristics of the camera, such as focus, aperture, exposure time, etc.

In certain implementations, a sound interface 316 is provided as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored.

In accordance with certain example implementations of the disclosed technology, the application programs 326 can include special-purpose software that may perform one or more of the following functions: receive images via the camera interface, process images, process location data, classify images according to trained machine vision models, etc.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has an appropriate structure to be a computer processor. In one arrangement, the computer CPU 302 may include more than one processing module. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive modules, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing module (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general-purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high-level and/or low-level software instructions, such as machine code (e.g., such as that produced by a compiler) and/or high-level code that can be executed by a processor using an interpreter.

Figure 4:
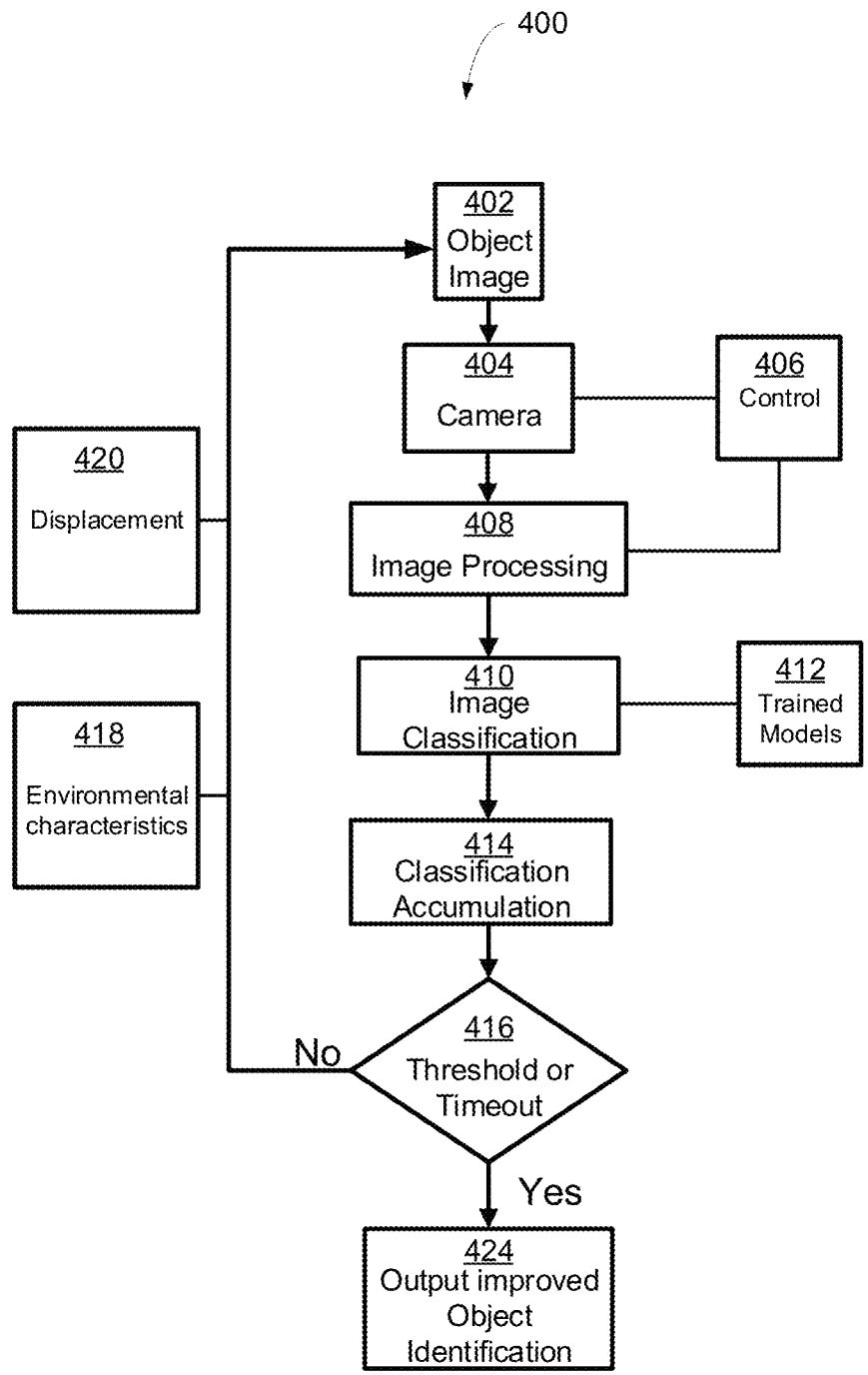
FIG. 4 depicts an example process 400 for enhanced object identification, according to an example implementation of the disclosed technology.

FIG. 4 depicts an example process 400 for providing an improved object identification, according to an example implementation of the disclosed technology. In accordance with certain example implementations of the disclosed technology, an object image 402 is captured by a camera 404. In an example implementation, certain control 406 (such as exposure and/or focus control) may be utilized to set certain parameters of the camera 404 for capturing the object images 402. In one example implementation of the disclosed technology, a variable exposure schedule may be utilized as a control 406 for controlling the camera 404, for example, to provide different image brightness and/or contrast for captured object images 402.

In accordance with an example implementation of the disclosed technology, the camera 404 may output image data that may undergo further image processing 408, such as normalization, edge detection, noise reduction, sharpening, brightness adjustment, contrast adjustment, color adjustment, etc. In certain example implementations, the image processing 408 (if any) applied to the image data may be governed by the control 406.

In accordance with certain example implementations of the disclosed technology, the (processed or raw) image data may undergo image classification 410 by a machine vision system and associated machine vision model trained to recognize particular vehicles 412. In certain example implementations, the image classification 410 may utilize a neural network to score the image data according to the match to the vehicles 412 (such as depicted and discussed above with reference to Table 1).

According to an example implementation of the disclosed technology, a classification accumulation 414 process may receive the image classification 410 information and accumulate scores for each set of image data (such as depicted and discussed above with reference to FIGS. 2A, 2B, and Table 2).

In accordance with certain example implementations of the disclosed technology, a threshold or timeout 416 may be checked and utilized to further control the process 400. For example, if neither a classification accumulation scoring threshold (such as thresholds 208 and 212 as discussed above with reference to FIGS. 2A and 2B) nor a timeout is met, the process 400 may be repeated by capturing another object image 402. As discussed above, certain environmental characteristics 418 (such as lighting, etc.) may be varied during the process 400 and may be reflected in variations of the object image 402 (as illustrated in frames 210 of FIG. 2B). In certain example implementations, displacement 420 of the camera and/or object may occur during the process 400 and may be reflected in various perspective views of the object image 402 (as illustrated in the frames 204 of FIG. 2A).

In accordance with certain example implementations of the disclosed technology, the threshold and/or timeout 416 may be checked and utilized to terminate the process 400. For example, if a classification accumulation scoring threshold (such as thresholds 208 and 212 as discussed above with reference to FIGS. 2A and 2B) or a timeout is met, the process 400 may be terminated and may output improved object identification 424.

Figure 5:
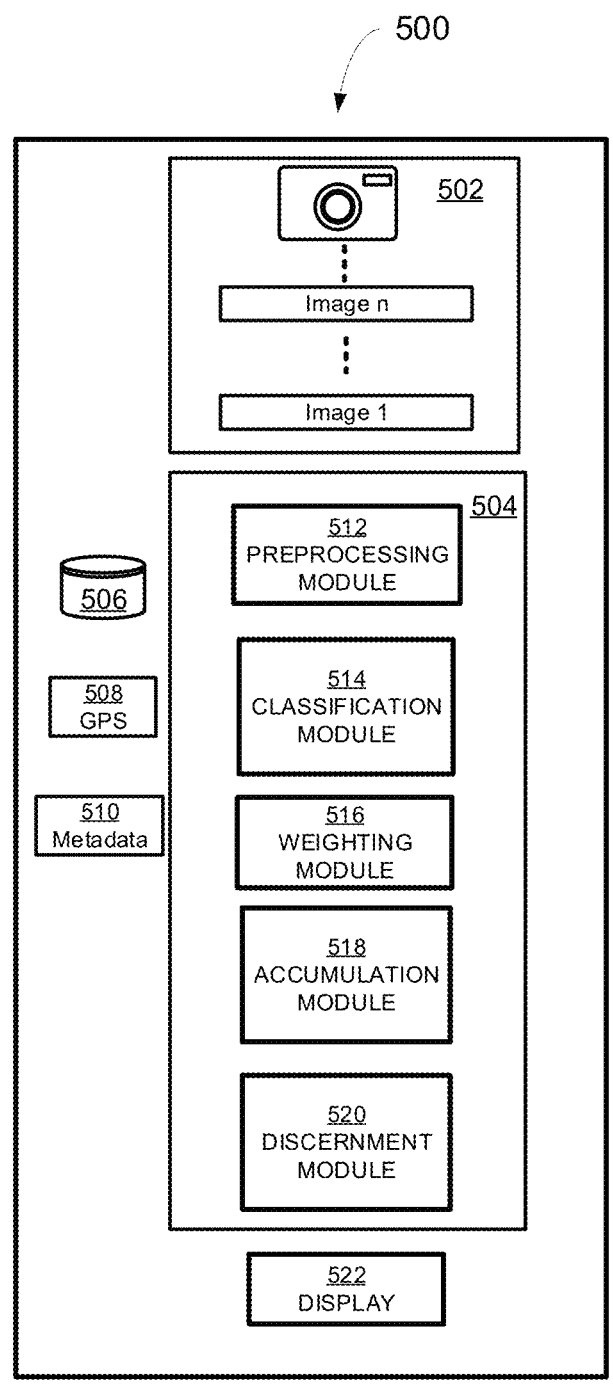
FIG. 5 is a block diagram of an illustrative mobile computing device 500 and associated modules that may be utilized to enhance object recognition.

FIG. 5 is a block diagram of an illustrative mobile computing device 500 according to an example implementation of the disclosed technology. Certain implementations of the mobile computing device 500 may include some (or all of) the components as discussed with reference to the computing device 300 of FIG. 3. Certain example implementations of the mobile computing device 500 may be utilized to perform some (or all of) the process steps as discussed above with regard to FIG. 4.

According to an example implementation of the disclosed technology, the mobile computing device 500 may be configured with a camera 502 capable of capturing multiple images. In certain example implementations, a software app 504 having special purpose modules 512-520 may be utilized to enhance object recognition. Certain example implementations may utilize trained machine learning and/or machine vision model data stored in memory 506 for used with the classification module 514. Certain example implementations may utilize location information from a GPS receiver 508, as discussed above, for selecting one or more machine vision models. In certain example implementations, metadata 510 associated with (or extracted from the images) may be used as input to one or more of the modules 512-520 of the app 504.

In accordance with certain example implementations of the disclosed technology, the app 504 may include one or more of the following modules: a preprocessing module 512; a classification module 514; a weighting module 516; an accumulation module 518; and a discernment module 520.

In an example implementation, the preprocessing module 512 (if present) may be utilized to process the input image information so that it can be efficiently used by the classification module 514. For example, in one implementation, the preprocessing module 512 may be utilized to re-sample the image information so that it is compatible with the information in the machine vision models. In certain example implementations, the preprocessing module 512 may be utilized to perform certain enhancements to the image information, including but not limited to: noise reduction, de-blurring, sharpening, brightness adjustments, contrast adjustments, normalization, quantization, extrapolation, dithering, etc.

In accordance with certain example implementations of the disclosed technology, the classification module 514 may utilize a neural network for scoring the input image information according to one or more trained machine vision models, as discussed above with reference to Table 1.

In certain example implementations, a weighting module 516 may be utilized in conjunction with the classification module 514 to apply certain scoring weights to the classification scores based on various factors including, but not limited to: location information, image quality, metadata 510, etc. For example, the weighting module 516 may receive certain processing parameters from the preprocessing module 512, and if the preprocessing module 512 detects an issue with the image (excessive noise, blur, focus issues, etc.), the weighting module 516 it may apply a reduced classification score for that particular image.

In accordance with certain example implementations of the disclosed technology, an accumulation module 518 may be utilized to sum the scores output by the classification module 514 (and/or weighting module 516), as discussed above with respect to Table 2.

Certain example implementations of the disclosed technology may include a discernment module 520. The discernment module 520 may be utilized to perform the timeout and/or thresholding functions as previously explained with reference to the threshold or timeout 416. In certain example implementations, the discernment module 520 may be configured to provide an indication of an identified object for output to the display 522.

Figure 6:
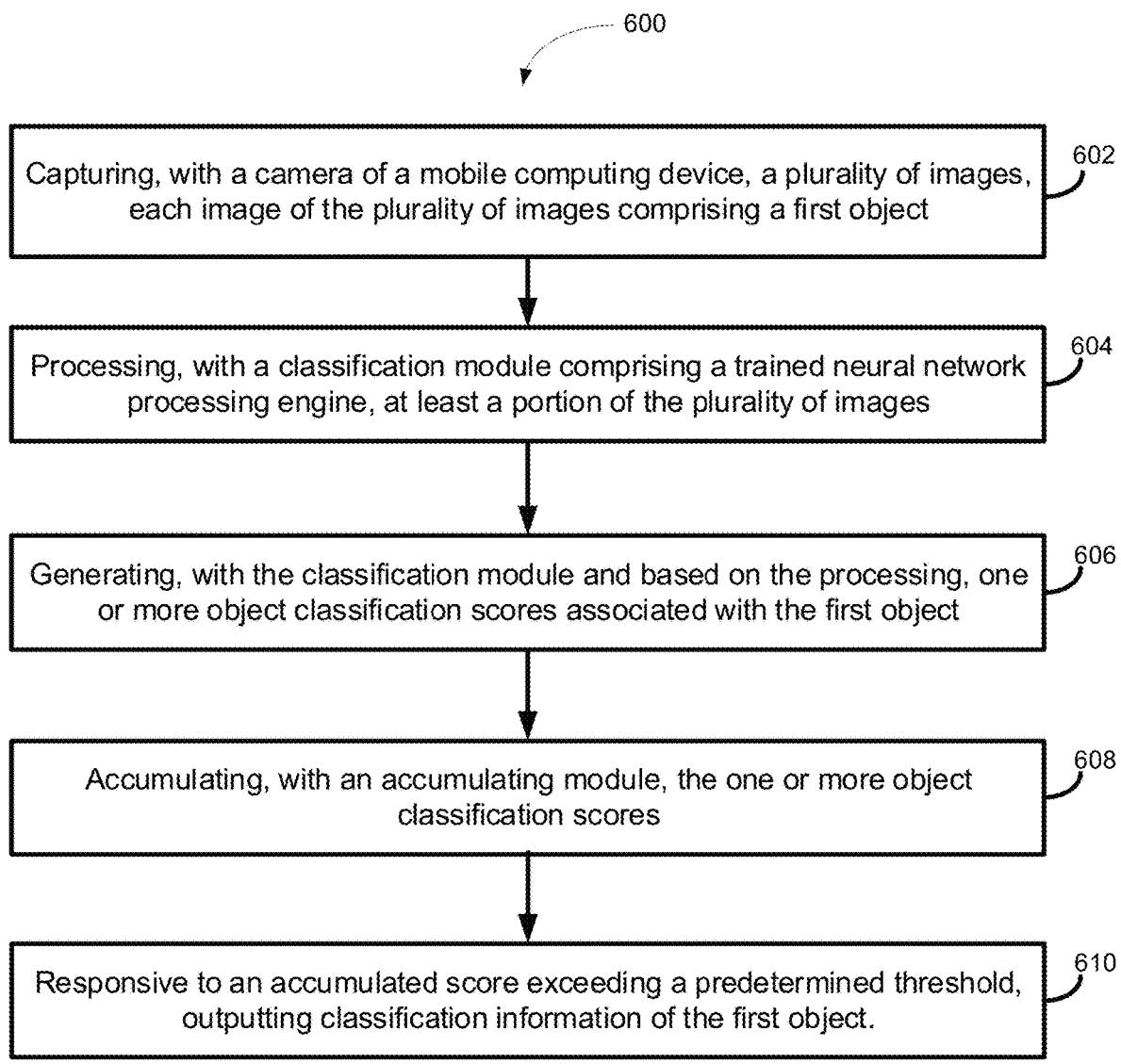
FIG. 6 is a flow diagram of a method 600 according to an example implementation of the disclosed technology.

FIG. 6 is a flow diagram of a method 600 according to an example implementation of the disclosed technology. In block 602, the method 600 includes capturing, with a camera of a mobile computing device, a plurality of images, each image of the plurality of images comprising a first object. In block 604, the method 600 includes processing, with a classification module comprising a trained neural network processing engine, at least a portion of the plurality of images. In block 606, the method 600 includes generating, with the classification module and based on the processing, one or more object classification scores associated with the first object. In block 608, the method 600 includes accumulating, with an accumulating module, the one or more object classification scores. Responsive to an accumulated score exceeding a predetermined threshold, block 610 of method 600 includes outputting classification information of the first object.

In accordance with certain example implementations of the disclosed technology, classification information of the first object may be output responsive to a timeout.

As discussed herein, the plurality of captured images can include a corresponding plurality of different views of the first object including but not limited to: different lighting, different perspectives, different contrast, different brightness, and different size.

According to an example implementation of the disclosed technology, a single machine vision model may encapsulate different processes, operations, and/or outcomes to provide distinct, independent probabilities based on different features of the object. For example, in the scenario of the vehicle identification, a single machine vision model may provide one matching score for the vehicle make/model, one matching score for vehicle model/trim, and one matching score for vehicle year. According to an example implementation, an aggregate score may be output based on the individual feature scores. Certain implementations may provide the aggregate score based on a sum of the individual feature scores. In certain example implementations, the aggregate score may be based on weighted individual feature scores. For example, it may be beneficial to assign a higher weight to the vehicle model/trim score compared with the vehicle year score for certain vehicles, particularly if certain related features remain substantially constant from year-to-year for a particular vehicle.

While each of the machine vision feature scoring functions, as discussed above, may be broken out into separate files and/or loaded and/or operated independently, certain example implementations of the disclosed technology may encapsulate the various machine vision feature scoring functions into the same machine vision model file, for example, to improve performance, stability, and/or speed of the object recognition process.

According to an example implementation of the disclosed technology, different machine vision model files (with or without corresponding encapsulated feature scoring functions) may be selected for download (and/or automatically loaded) into the user's mobile device depending on such factors as location, user preferences, inventory database, etc. For example, a user located in a certain region or country may download (and/or may be presented with the option of downloading) a machine vision model file that is specifically trained to recognize vehicles that are prevalent in that region or country. In another example implementation, a machine vision model file specific to older vehicles may be utilized, for example, to aid a user who is searching for used or retro vehicles. Such embodiments may provide technical benefits reducing the file size of the machine vision model file, allow customization for particular machine vision applications, improve performance, improve stability, and improve the speed of the object recognition process.

In certain example implementations, the machine vision model file may be modularized to perform specific recognition functions for a selected subset of objects and/or features. In one example implementation, a machine vision model may be utilized to distinguish/classify whether an object image is (or is not) a particular object. In the case of vehicle identification, the machine vision model may perform the modularized recognition process for a set of captured images to indicate whether they correspond to a particular selected vehicle make/model/year.

Certain example implementations of the disclosed technology can include moving the camera while capturing the plurality of images. In certain example implementations, the camera movement may be based on a natural movement of a user while the user is substantially stationary. In certain example implementations, the image capture process may commence when the user's mobile device is held substantially stationary and may pause during periods of high motion, such as walking between two different vehicles. Certain example implementations may use the image capture pausing (based on detected movement) to conserve battery charge and/or reduce the heat associated with the use of the user's mobile device.

Certain implementations may include applying weighting to one or more of the plurality of classification scores. Certain example implementations can include preprocessing one or more of the captured image frames. In an example implementation, applying the weighting may be based at least in part on the preprocessing. According to an example implementation of the disclosed technology, temporal weighting may be utilized preferentially weight newer captured images. In certain example implementations, temporal weighting may be utilized preferentially weight older captured images. According to certain example implementations, preprocessing can include adjusting one or more of brightness, contrast, hue, and sharpness associated with one or more of the plurality of captured image frames.

As disclosed herein, the accumulation and/or weighting of classification scores for multiple input images of an object can provide the technical effect of boosting the recognition accuracy compared to the recognition accuracy of a single input image. Certain example implementations may provide the technical effect of boosting the recognition accuracy of an object using a mobile computing device, such as a smart phone. In certain instances, the recognition accuracy can be increased by up to 2%. In certain example implementations, the recognition accuracy can be increased by up to 10%. In certain example implementations, the recognition accuracy can be increased by up to 20%. In certain example implementations, the recognition accuracy may depend on factors such as image quality, the number of distinct views of the object represented in the plurality of images, the quality of trained machine vision model(s), etc.

Certain example implementations of the disclosed technology may utilize artificial neural networks to process input image frames, for example, by classifying the input image frames by a probable match with one or more trained machine vision models. In certain example implementations, a set of input values and associated weights may be derived from certain features of the input image frames. In accordance with certain example implementations of the disclosed technology, a function may sum the weights and map the results to an output.

In certain example implementations, neurons associated with the neural network may be organized into layers: input, hidden and output. The input layer may include values that are inputs to the next layer of hidden neurons. Several hidden layers can exist in one neural network. The final layer may be the output layer and may include one node for each class. In certain example implementations of the disclosed technology, a sweep forward through the network may result in an assignment of a value to each output node, and the input image may be assigned to the class node with the highest value.

In the training phase, the correct class (for example, vehicle make/year/model) for each object may be known via supervised training, and the output nodes can be assigned correct values, such as "1" for the node corresponding to the correct class, and "0" for the others. Certain example implementations of the disclosed technology may compare the network's calculated values for the output nodes to the correct values to calculate an error term for each node. The error terms may be utilized to adjust the weights in the hidden layers so that, during the next iteration the output values will be closer to the correct values.

One feature of neural networks, as disclosed herein, is an iterative learning process that may be utilized to train the machine vision model(s). For example, training images may be presented to the network one at a time, and the weights associated with the input values may be adjusted. After all training images are presented, the process may be repeated to refine the machine vision model training. In one example implementation of the disclosed technology, and during this learning phase, the network may be trained by adjusting the weights to predict the correct classification label of input images. Advantages of neural networks include their high tolerance to noisy data, as well as their ability to classify patterns on which they have not been trained.

In certain example implementations, the neural network may process the training images one at a time, using the weights and functions in the hidden layers. The resulting outputs may then be compared against the desired outputs. In certain example implementations, errors may be propagated back through the network to adjust the weights for application to the next training image. During the training of a network, the same set of training data may be processed many times as the connection weights are continually refined. In certain example implementations, a recursive neural network may be utilized during training and/or during the recognition process. For example, a recursive neural network may utilize classification information from a set of images to adjust classification for a single image.

Certain example implementations of the disclosed technology may utilize neural networks that are pre-trained for particular subsets of objects (such as vehicles, buildings, monuments, etc.). Once the network has been trained, it may receive one or more image frames of an object as input to the neural network. The neural network may process the input image and assign value to each output node. The input image frame may be assigned to a classification with the highest value and/or best match to a particular trained object.

The systems and methods disclosed herein may take advantage of modern computer architecture for significant improvements in object recognition. As used in this application, the terms "component," "module," "system," "server," "processor," "memory," and the like are intended to include one or more computer-related modules, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include but are not limited to portable computers, tablet PCs, internet tablets, PDAs, ultra-mobile PCs (UMPCs), wearable devices, and smart phones. Additionally, implementations of the disclosed technology can be utilized with the internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

In certain example implementations, the mobile computing device may utilize a machine vision model for use with a recognition app running on the mobile computing device. In certain example implementations, the machine vision model may be capable of distinguishing certain objects among a plurality of objects. In certain example implementations, the recognition app may be an executable software program configured to process the plurality of input images of an object of interest and classify the input images based on matching features with the pre-trained machine vision model. According to an example implementation of the disclosed technology, the machine vision model may use about 20 to 50 Mbytes of memory on the mobile computing device. In certain example implementations, a machine vision model may use about 50-500 Mbytes of memory on the mobile computing device.

In one exemplary use case, a user may be shopping for a vehicle and may be walking around a dealer lot to inspect the dealer's car inventory for a possible purchase. The user may see a vehicle of interest on the lot, and the user may want to know more information about the vehicle. In one example implementation of the disclosed technology, the user may have previously downloaded the recognition app (and associated machine vision model data) to their smart phone. In this case, the user may retrieve their smart phone and launch the recognition app. The app may feed a live image from the mobile computing device camera to the display while capturing a series of images. In certain example implementations, prompts may be output to the display, for example, to alert the user to adjust the position of the camera relative to the object for optimum framing of the vehicle, to hold the smart phone still, etc. According to an example implementation of the disclosed technology, the app may automatically start capturing image frames once the camera is directed towards a vehicle, without requiring any additional input from the user.

In an example implementation, once sufficient classification has been performed (i.e., accumulated classification counts exceeding a threshold) on the input image frames of the vehicle, the app may output identifying information about the vehicle to the display of the mobile computing device. Such information may include: make, model number, year, features, comparative pricing, etc.

Certain example implementations of the disclosed technology may utilize location information (such as GPS coordinates, geofencing, etc.) to provide additional enhancements to the process of object recognition. For example, a GPS receiver on the user's mobile computing device may be utilized to determine an approximate location for which the different image frames are captured. In the example use case scenario where the user is located at a vehicle dealership lot, the image recognition application may filter the object classification scores based on location to exclude objects that are not expected to be present at that location. In another example scenario, the image recognition application may utilize a machine vision model to correspond with a subset of objects (certain vehicle brands, for example) that are likely to be nearby based on the location data. In certain example implementations of the disclosed technology, signage, QR codes, barcodes, emblems, and/or other identifying features near or attached to the object may be utilized to enhance object recognition and/or to identify a particular vehicle with high confidence. In certain example implementations, the object recognition information may be utilized to retrieve additional detailed information about a particular vehicle, including but not limited to: dealer's price for the vehicle, history of the vehicle, financing terms, etc.

In certain example implementations, the user may download, (while on the dealer's lot) the recognition app and/or trained machine vision model data and/or related information specific to the current dealer lot identified by the location data.

The disclosed technology may leverage video/image capturing capabilities of a mobile computing device while providing one or more pre-trained machine vision models and neural network classification software that may be stored locally on the mobile computing device. Certain example implementations of the disclosed technology enable image capturing, classification, and recognition output to be performed on the mobile computing device.

In one example implementation of the disclosed technology, a series of image frames may be captured by a camera of a mobile computing device, and at a rate of about 15 image frames per second. In certain example implementations, the capturing of the image frames may continue until a predetermined minimum number of input frames are captured. In certain example implementations, if the number of input image frames has not met a threshold (for example, if the user terminates the image capture prematurely) the recognition app may alert the user that more images are needed. In certain example implementations, the systems and methods disclosed herein may arrive at a recognition consensus after processing about 4-10 image frames. According to an example implementation of the disclosed technology, once the recognition process has finished, an indication identifying the object of interest may be sent to the display of the mobile computing device.

In certain example implementations, video information comprising a series of image frames of an object may be utilized to perform object recognition by the systems and methods disclosed herein. According to an example implementation of the disclosed technology, the image/video capturing and recognition process disclosed herein may be configured to commence automatically after a user launches the recognition app, and once the mobile computing device is held still with an object of interest in view of the camera. In certain example implementations, a user may direct the camera to another object of interest, and the recognition app may start a new capturing/recognition process without requiring additional input or prompting from the user.

We claim:

1. A machine vision system comprising:
one or more processors;
memory in communication with the one or more processors and storing instructions that, when executed by the one or more processors, cause the system to:
receive a plurality of images captured by an image capturing device of a handheld mobile computing device, each image of the plurality of images comprising a first stationary object, and wherein the plurality of images include different perspectives of the first object based on relative movement of the mobile computing device and the first object;
generate, based the plurality of images, a corresponding plurality of object classification scores associated with the first object, wherein the object classification scores represent confidence that the first object matches one or more classifications of objects recognizable by a trained machine vision model;
accumulate the plurality of object classification scores;
output classification information of the first object corresponding to a highest accumulated classification score, the classification information being indicative of type of the first object; and
output an indication of the classification information.

2. The machine vision system of claim 1, wherein the plurality of images includes different views of the first object, wherein different views comprise one or more of: different lighting, different perspectives, different contrast, different brightness, and different size.

3. The machine vision system of claim 1, wherein the classification information comprises vehicle model information.

4. The machine vision system of claim 1, wherein the classification information is output responsive to a dynamically adjusted threshold, wherein the dynamically adjusted threshold is set based on: a percentage of accumulated classification counts, one or more differences between accumulated classification counts, and a minimum classification count value.

5. The machine vision system of claim 1, wherein the instructions, when executed by the one or more processors, cause the system to further modify one or more of the plurality of object classification scores.

6. The machine vision system of claim 5, wherein the one or more of the plurality of object classification scores are modified based at least in part on a preprocessing of the plurality of images.

7. The machine vision system of claim 1, wherein the instructions, when executed by the one or more processors, cause the system to further adjust one or more of brightness, contrast, hue, and sharpness associated with one or more of the plurality of images.

8. A method comprising:
receiving, a plurality of images captured by an image capturing device of a handheld mobile computing device, each image of the plurality of images comprising a first stationary object, wherein the plurality of images include different perspectives of the first object based on relative movement of the mobile computing device and the first object;
processing, with a classification module comprising a trained neural network processing engine, at least a portion of the plurality of images;
generating, with the classification module and based on the processing, one or more object classification scores associated with the first object, wherein the object classification scores represent confidence that the first object matches one or more classifications of objects recognizable by a trained machine vision model;

accumulating, with an accumulating module, the one or more object classification scores; and responsive to an accumulated score exceeding a predetermined threshold, outputting classification information of the first object corresponding to a highest accumulated classification score, the classification information being indicative of type of the first object.

9. The method of claim 8, further comprising outputting classification information of the first object responsive to a dynamically adjusted threshold, wherein the dynamically adjusted threshold is set based on: a percentage of accumulated classification counts, one or more differences between accumulated classification counts, and a minimum value.

10. The method of claim 8, wherein the plurality of images includes different views of the first object, wherein different views comprise one or more of: different lighting, different perspectives, different contrast, different brightness, and different size.

11. The method of claim 8, further comprising outputting classification information of the first object responsive to a timeout.

12. The method of claim 8, further comprising applying weighting to the one or more object classification scores.

13. The method of claim 12, further comprising preprocessing one or more of the plurality of images, and wherein applying the weighting is based at least in part on the preprocessing.

14. The method of claim 13, wherein preprocessing comprises adjusting one or more of brightness, contrast, hue, and sharpness associated with one or more of the plurality of images.

15. A non-transitory computer readable storage medium storing instructions for use with a machine vision system, wherein the instructions cause the system to perform a method comprising:

receiving, a plurality of images captured by an image capturing device of a handheld mobile computing device, each image of the plurality of images comprising a first stationary object, and wherein the plurality of images include different perspectives of the first object based on relative movement of the mobile computing device and the first object;

processing, with a trained neural network processing engine, at least a portion of the plurality of images;

generating, based on the processing, one or more object classification scores associated with the first object, wherein the object classification scores represent confidence that the first object matches one or more classifications of objects recognizable by a trained machine vision model;

accumulating the one or more object classification scores; and responsive to an accumulated score exceeding a predetermined threshold, outputting classification information of the first object corresponding to a highest accumulated classification score, the classification information being indicative of type of the first object.

16. The non-transitory computer readable storage medium of claim 15, further comprising outputting classification information of the first object responsive to a dynamically adjusted threshold, wherein the dynamically adjusted threshold is set based on: a percentage of accumulated classification counts, one or more differences between accumulated classification counts, and a minimum value.

17. The non-transitory computer readable storage medium of claim 15, wherein the plurality of images includes different views of the first object, wherein different views comprise one or more of: different lighting, different perspectives, different contrast, different brightness, and different size.

18. The non-transitory computer readable storage medium of claim 15, further comprising outputting classification information of the first object responsive to a timeout.

19. The non-transitory computer readable storage medium of claim 15, further comprising applying weighting to one or more of the object classification scores.

20. The non-transitory computer readable storage medium of claim 19, further comprising preprocessing one or more of the plurality of images, and wherein applying the weighting is based at least in part on the preprocessing, wherein preprocessing comprises adjusting one or more of brightness, contrast, hue, and sharpness associated with one or more of the plurality of images.

* * * * *